June 16, 1953   O. K. REINHARDT ET AL   2,642,471
DRY CELL
Filed June 7, 1951
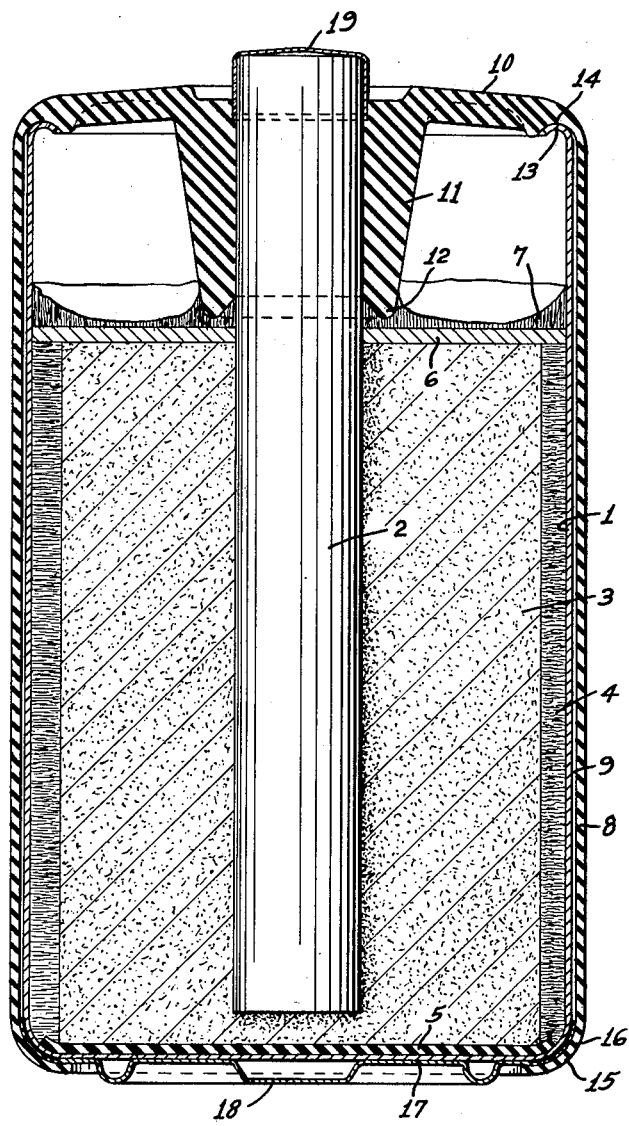
INVENTORS
O. K. Reinhardt
Thomas C. Stapleton
BY
Pennie, Edmonds, Morton, Barrows and Taylor
ATTORNEYS Patented June 16, 1953

2,642,471

UNITED STATES PATENT OFFICE 2,642,471

DRY CELL

Otto Karl Reinhardt and Thomas C. Stapleton, West Haven, Conn., assignors to Olin Industries, Inc., New Haven, Conn., a corporation of Delaware Application June 7, 1951, Serial No. 230,392

3 Claims. (Cl. 136—133)

This invention relates to dry cells and more particularly to a leak-resistant cell construction which may be used in flashlight batteries.

Many types of leak-resistant flashlight cells have been proposed during recent years. Some of these proposals have been adapted with more or less success but a completely satisfactory leak-resistant cell has not yet been produced.

In the present invention we provide a leak-resistant cell in which the can forming the anode is surrounded by a plastic jacket having a top closure integral therewith. The top closure is provided with an opening for the passage of the protruding end of the carbon electrode and a collar extends downwardly from the edge of the disc surrounding this opening. This collar is of such length that its lower edge is received in the layer of material capable of softening by heat, such as pitch, wax or the like, which is arranged on a washer above the depolarizing mix of the cell. The sealing material is thus forced between the lower edge of the collar and the carbon electrode forming a very efficient seal. The seal is thus designed so that its efficiency is increased by occurrence of internal pressure in the cell. In other words, when such a pressure is developed, the sealing material is forced between the collar and the carbon pencil, thus making it more difficult for liquid to leak upward between the collar and the pencil.

The one-piece plastic jacket is advantageous in that it is readily amenable to mass production by automatic molding machinery. By forming the seal around the carbon pencil at the bottom of the collar, the necessity of insert molding of the metal contact cap into the closure disc is avoided. The metal contact cap in the present construction forms a force-fit over the carbon pencil and is not in sealing arrangement with the closure. In actual construction, a space will exist between the carbon cap and the surrounding opening in the closure.

The plastic jacket is preferably formed of a thermoplastic insulating composition consisting primarily of a thermoplastic resin, such as polystyrene, cellulose acetate butyrate, ethyl cellulose, or polyvinyl chloride acetate. It is made of sufficient length so that the bottom rim can be turned inwardly over the base of the metal can constituting the anode of the cell. It is usually desirable to secure this lower edge of the jacket to the can by means of a suitable sealing adhesive to prevent leakage around this area if openings develop in the side wall of the cell and permit leakage of electrolyte into the space between the outer wall of the can and the surrounding jacket. We preferably employ a bottom construction including an extra metallic disc, which is sealed in place by the in-turned rim of the plastic jacket.

In the accompanying drawing, the figure is a vertical, sectional view of a dry cell showing the invention applied thereto.

Referring to the drawing, the reference numeral 1 designates the zinc can of a dry cell which is of conventional construction. A cathode consisting of a carbon pencil 2 is arranged in the can, preferably being centrally disposed, the zinc or other metal can and the carbon forming the two electrodes of the cell. As shown, the carbon electrode protrudes slightly above the top of the cell to form a terminal when a plurality of cells of this type are used in tandem as in a flashlight casing. The carbon electrode is surrounded by the usual core 3 of depolarizing material preferably consisting of a mixture of manganese dioxide and a carbonaceous material, such as graphite, powdered carbon or the like. As shown, the core is slightly spaced from the zinc can and an electrolyte paste containing the usual electrolytes is arranged in the space 4 between the depolarizing mix and the can. An insulating washer 5 is placed in the bottom of the can and a washer 6 is arranged above the depolarizing mix, and may be seated in a groove in the can. A layer 7 of a sealing material capable of being softened by heat, such as pitch, wax or the like, is arranged on the washer 6.

The jacket forming the subject matter of the present invention consists of a cylindrical body portion 8 which is of proper length and diameter to entirely surround the can and provide a slight space between the can and the jacket, as indicated at 9, for the reception of any electrolyte which may leak from the can through openings formed in the wall of the zinc can during use of the cell. The upper end of the surrounding jacket is formed into a closure member or disc 10 which covers the top of the cell. This disc is provided with a central opening of a diameter to receive the carbon pencil and surrounding the opening the disc is provided with a depending collar or flange 11. The length of this collar or flange is such that it will extend downwardly into the sealing material 7 and its lower edge is preferably shaped, as indicated at 12, to cause the sealing material to flow between the collar and the carbon pencil. The upper edge of the zinc can is rolled inwardly, as indicated at 13, and adjacent the juncture of the jacket and the disc, the disc is shaped to be received on this rolled edge, as indicated at 14. This aids in properly positioning the lower edge 12 of the collar and also in properly positioning the lower edge of the jacket 8.

As stated, the lower edge 15 of the jacket is turned inwardly over the base of the cell and united to the base of the cell by a layer 16 of suitable adhesive. Preferably a metal disc 17 of tin-plated steel is arranged on the bottom of the cell, the disc being suitably embossed, as at 18, to insure contact between the base terminal of the cell and the central terminal of an adjacent cell when the cells are arranged in tandem. When such bottom disc is employed, the inturned edge 15 of the jacket seals it in place.

The carbon pencil is provided with the usual contact cap 19. With the effective seal of the cell formed at the bottom of the collar 11, it is unnecessary to secure the cap 19 in the closure disc by insert molding; in fact, in assembly there is some space between the cap and the closure disc. The cap forms a force-fit with the carbon pencil and is assembled after the plastic jacket has been put in place.

If electrolyte leaks through openings which may be formed in the side wall of the can, it remains in the space 9 between the zinc can and the jacket 8 and its discharge from the cell is prevented by the sealing 16 between the bottom of the can and the bottom of the jacket. Increase of internal pressure in the cell improves the seal at the bottom of the collar 11. Upon such increase in pressure, additional sealing material is forced into the space between the collar and the carbon pencil, making leakage upwardly around the carbon pencil more difficult. However, evolved gases may readily escape from the cell through the pores of the carbon electrode or through jacket 8.

In a copending application of the applicant, Reinhardt, and Jay Y. Welsh, Serial No. 230,391 filed June 7, 1951, there is disclosed and claimed a related and similar construction of leakproof cell. The cell disclosed in that application is provided with a jacket surrounding the zinc can and with a closure disc arranged at the top of the can, the closure disc having a peripheral flange and also having a flange surrounding the central opening, which flanges are embedded in sealing material placed on top of the washer in the cell.

We claim:

1. A leak-resistant dry cell comprising a metal can forming an anode, a cathode and a depolarizing mix arranged in the can, the cathode projecting from the top of the can, a washer arranged in the can above the depolarizing mix, a layer of material capable of being softened by heat on said washer, a plastic jacket surrounding the can, the lower edge of the jacket being turned in over the bottom of the can and adhesively secured thereto, a closure disc formed integrally with the jacket, the closure disc having a central opening for the passage of the cathode, and a collar depending from the closure disc around the central opening and adapted to be embedded in the layer of sealing material.

2. A leak-resistant dry cell comprising a metal can forming an anode, a cathode and a depolarizing mix arranged in the can, the cathode projecting from the top of the can, a washer arranged in the can above the depolarizing mix, a layer of material capable of being softened by heat on said washer, a plastic jacket surrounding the can, the lower edge of the jacket being turned in over the bottom of the can and adhesively secured thereto, a closure disc formed integrally with the jacket, the closure disc having a central opening for the passage of the cathode, a collar depending from the closure disc around the central opening and adapted to be embedded in the layer of sealing material, and a metal disc on the bottom of the anode can, the metal disc being retained in position by the inturned edge of the jacket.

3. A leak-resistant dry cell comprising a metal can forming an anode, a cathode and a depolarizing mix arranged in the can, the cathode projecting from the top of the can, a washer arranged in the can above the depolarizing mix, a layer of material capable of being softened by heat on said washer, a plastic jacket surrounding the can, the lower edge of the jacket being turned in over the bottom of the can and adhesively secured thereto, a closure disc formed integrally with the jacket, the closure disc having a central opening for the passage of the cathode, a collar depending from the closure disc around the central opening and adapted to be embedded in the layer of sealing material, the lower edge of the collar being shaped to force the sealing material between the collar and the cathode.

OTTO KARL REINHARDT.
THOMAS C. STAPLETON.

References Cited in the file of this patent

UNITED STATES PATENTS

| Number | Name | Date |
|---|---|---|
| 2,169,702 | Marsal | Aug. 15, 1939 |
| 2,399,089 | Anthony | Apr. 23, 1946 |
| 2,445,005 | Schmelzer | July 13, 1948 |
| 2,450,813 | Reinhardt et al. | Oct. 5, 1948 |